(12) United States Patent
Trappa

(10) Patent No.: US 7,178,781 B2
(45) Date of Patent: Feb. 20, 2007

(54) VALVE OR TAP FOR FLUIDS WITH LOCKING DEVICE

(75) Inventor: Angelo Trappa, Castegnato (IT)

(73) Assignee: Valvosanitaria Bugati S.p.A., Castegnato (IT)

( * ) Notice: Subject to any disclaimer, the term of this patent is extended or adjusted under 35 U.S.C. 154(b) by 163 days.

(21) Appl. No.: 10/833,257

(22) Filed: Apr. 28, 2004

(65) Prior Publication Data

US 2004/0238770 A1 Dec. 2, 2004

(30) Foreign Application Priority Data

Apr. 30, 2003 (IT) .......................... BS2003A0041

(51) Int. Cl.
*F16K 35/00* (2006.01)

(52) U.S. Cl. ........................................ 251/96
(58) Field of Classification Search ................. 251/96, 251/97, 95

See application file for complete search history.

(56) References Cited

U.S. PATENT DOCUMENTS

| | | | | | |
|---|---|---|---|---|---|
| 1,933,177 A | * | 10/1933 | Kindl | ........................... | 251/96 |
| 1,953,776 A | * | 4/1934 | Roberts | ........................ | 251/96 |
| 2,064,623 A | * | 12/1936 | Mueller | ........................ | 251/96 |
| 2,284,996 A | * | 6/1942 | Stuckenholt | .................. | 251/96 |
| 2,652,226 A | * | 9/1953 | Huff | .............................. | 251/96 |
| 2,723,102 A | * | 11/1955 | Mueller | ........................ | 251/96 |
| 3,012,584 A | * | 12/1961 | Carlson et al. | ................ | 251/96 |
| 3,292,660 A | * | 12/1966 | Zarybnicky | ................... | 251/96 |

* cited by examiner

*Primary Examiner*—John Bastianelli
(74) *Attorney, Agent, or Firm*—Hogan & Hartson LLP

(57) ABSTRACT

A valve or tap for fluids comprises a body, a revolving shutter in the body between a closing position and opening position, and control mechanism for rotating the shutter. The control mechanism can be moved axially between a raised position in which it is locked angularly to the body of the valve and a lowered position in which it is free to rotate. The control mechanism may be normally held in a raised position by an elastic part. The control mechanism may include a first pin joined to the shutter and a second pin constrained in an angular direction to the first pin. The second pin may be movable in an axial direction in relation to the first pin between a raised position for locking to the body and a lowered position for unlocking from the body.

9 Claims, 3 Drawing Sheets

VALVE OR TAP FOR FLUIDS WITH LOCKING DEVICE

FIELD OF THE INVENTION

The present invention relates to a valve or tap for fluids with a ball shutter set in the fluid passage duct revolving between an opening and closing position of said duct.

BACKGROUND OF THE INVENTION

In the known embodiments, the ball shutter is constrained to a control rod with a throttle or grip lever fixed at the free end for opening/closing the valve. In practice, it is enough to rotate the throttle or grip lever even just a little to alter the position of the ball shutter and therefore the section of the passage of the fluid. It has been noticed that in some cases, such rotations of the throttle can occur accidentally, for example during plant maintenance, after strong vibrations or by unauthorised people, for example children.

SUMMARY OF THE INVENTION

The object of the present invention is to resolve this type of problem by proposing a valve or tap for fluids of the type with ball shutter with a mechanical stop device to reduce the risk of accidental or unwanted rotations of the throttle or grip lever controlling the ball shutter.

Such object is achieved with a valve or tap for fluids comprising a body, a shutter revolving in said body between an opening and closing position, and control means for rotating said shutter, where said control means can be moved axially between a raised position in which they are locked angularly to the body of the valve and a lowered position in which they are free to rotate.

The control means, which can be operated by rotation using a throttle or grip lever, are normally held in a raised position by an elastic element and can be moved in a lowered position by applying a downward thrust on said throttle or grip lever sufficient to overcome the resistance of the elastic element.

In practice, then, in order to be able to rotate the throttle or grip lever, and therefore also the ball shutter with the control means, it is first necessary to unlock these means by moving them axially. In other words, two consecutive, separate manoeuvres rather than just one are needed to operate the valve.

It is therefore clear that the control devices of the valve or tap can only be rotated intentionally and by authorised personnel, who know how to work the throttle or grip lever.

DESCRIPTION OF THE DRAWINGS

An example of practical embodiment of the invention will nonetheless be described as follows in further detail with reference to the accompanying drawings, which are indicative and not limiting, wherein.

DESCRIPTION OF A PREFERRED EMBODIMENT OF THE INVENTION

Figure 1:
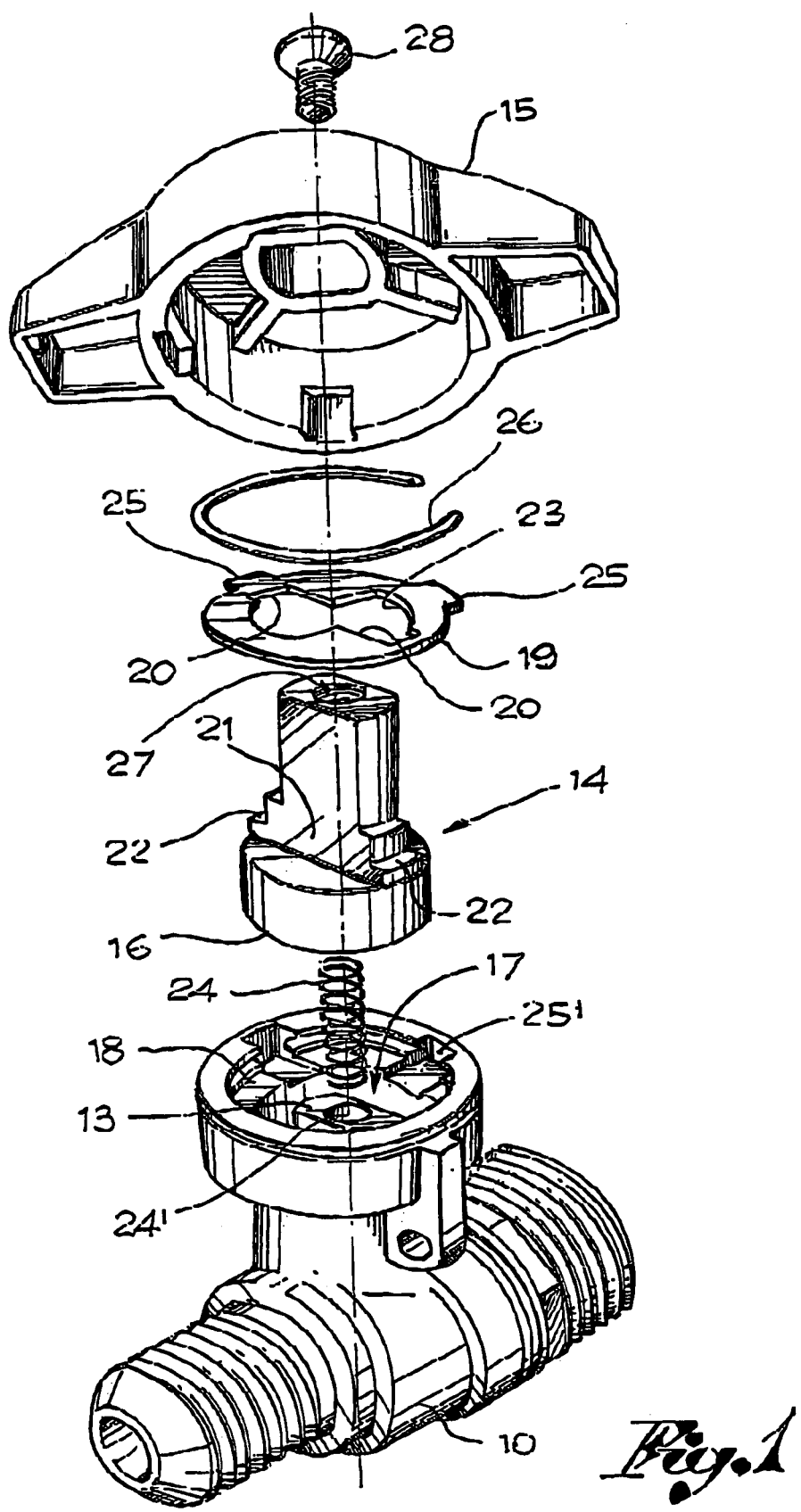
FIG. 1 shows an exploded perspective view of the control devices of a valve according to the invention.
Figure 2:
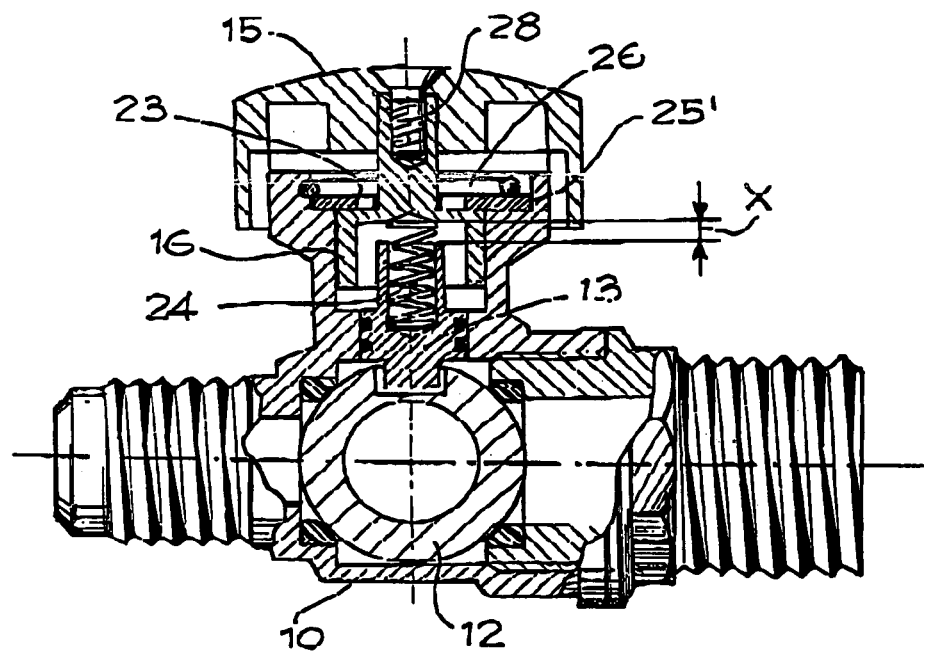
FIG. 2 shows an axial section of the valve in a locked position for closing the passage of the fluid.
Figure 3:
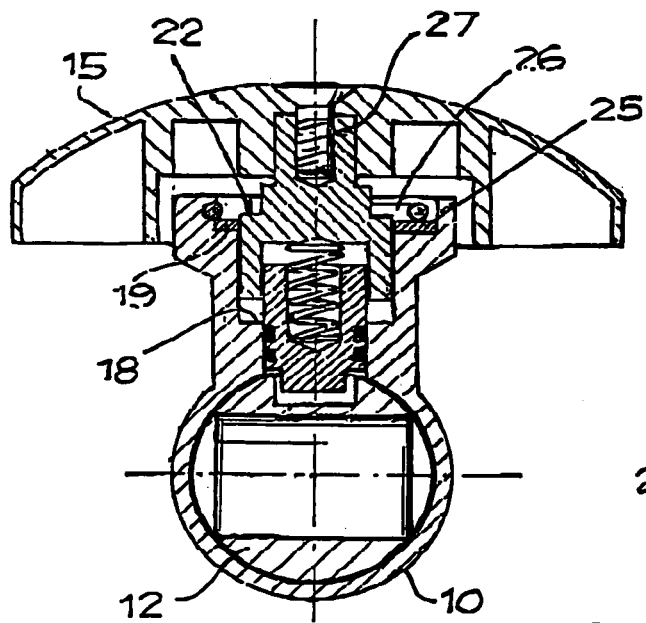
FIG. 3 shows a transversal section of the valve in a locked closed position.
Figure 4:
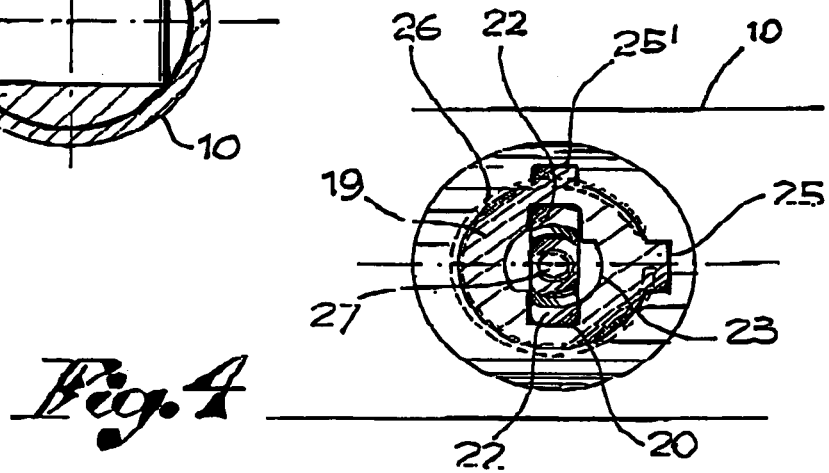
FIG. 4 represents a view from above of the valve control means in a locked closed position.

The valve or tap for fluids comprises a body 10 in which a duct 11 is made, in a known manner, for the passage of the fluid. A ball shutter 12 is set in the body 10 revolving between an open and closed position of the duct 11. Control means 13, 14 are connected to the ball shutter 12 by means of which the shutter can be rotated 90° between said two open and closed positions. A throttle or grip lever 15 is connected to the control means for this rotation.

According to the invention, the control means comprise a first pin 13 joined to the ball shutter 12 and a second pin 14 placed in prosecution of the first and constrained angularly to this, for example by means of geometric coupling. The throttle or grip lever 15 is screwed to the top of said second pin 14. The latter can also be moved axially in relation to the first pin 13 between a raised locked position, in which it is constrained angularly to the valve body, and cannot therefore be rotated, and a lowered unlocking position, in which the throttle or grip lever 15, the two pins 13, 14 and the ball shutter 12 can be rotated. The run of the second pin 14 in relation to the first 13 is indicated by X in the drawings.

The second pin 14 presents a cylindrical hollow base 16 for coupling with and sliding on the free end of the first pin 13. A stem 21 reaches up from the base 16, with a basically rectangular transversal section, with rounded sides of a smaller width, bearing a threaded hole 27 for screwing a screw 28 to fasten the throttle or grip lever 15. The cylindrical base 16 is guided externally into a round slot 17 made in the body 10 of the valve.

A step 18 is provided in the upper part of said round slot 17. A washer 19 is set on said step 18 in such a way to surround the second pin 14 and partially overlap the base 16; the inner form of the washer 19, together with that of the stem 21 of said second pin, allows this to be locked or unlocked depending on its axial position.

In particular, the washer 19 presents two radial diametrically opposite slits 20, in which the stem 21 of the second pin 14 is designed to engage. On each of the two rounded sides of a smaller width, the stem 21 presents a step 22 to define a lower part with a greater radial extension designed to engage in the slits 20 of the washer, and an upper part of a smaller radial extension to be able to rotate in the washer without interfering with said slits. The latter are also connected by two opposite circumference arcs 23 to allow the control means to rotate 90°.

The run X of the second pin 14, the height of the step 22 and the thickness of the washer 19 are chosen so that when the second pin 14 is in a raised position, the steps 22 engage in the slits 20; when the second pin 14 is pushed downwards, the steps 22 find themselves below the washer 19 and are released from the slits 20 allowing the control means to rotate.

The second pin 14 is normally held in a raised position by a helical spring 24 set in an axial slot 24' made in the first pin 13 that acts on the cylindrical base 16 of the second pin 14.

For this to be locked angularly to the body 10 of the valve, the washer 19 has at least one radial tooth 25, which is inserted into a corresponding notch 25' provided in said body 10. The washer 19 and the two pins 13, 14 are finally held in the relative slots in the body of the valve by an elastic ring 26 that is set and locked above the washer 19.

From the above, it will be appreciated that, before rotating the throttle or grip lever 15 from the locking position, pressure must be applied in an axial direction on said throttle, so that the second pin 14 moves towards the first releasing itself from the slits of the washer 19 only then can the control parts be rotated 90° to open the valve. Once these control parts have been brought back into the angular starting position, they will automatically return to the locking position thanks to the upward thrust of the spring 24.

Figure 5:
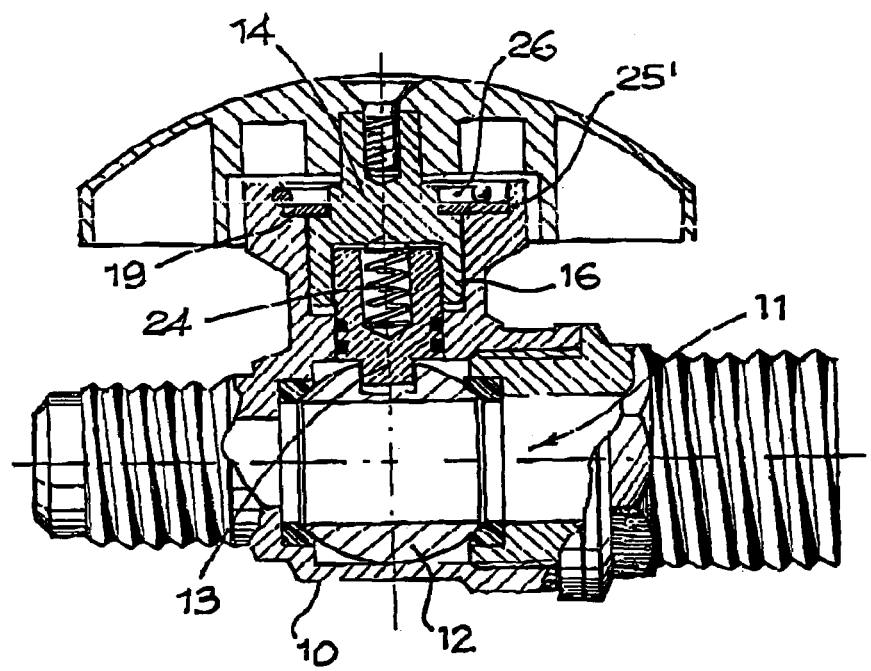
FIG. 5 shows an axial section of the valve in an unlocked position for opening the fluid passage duct.
Figure 6:
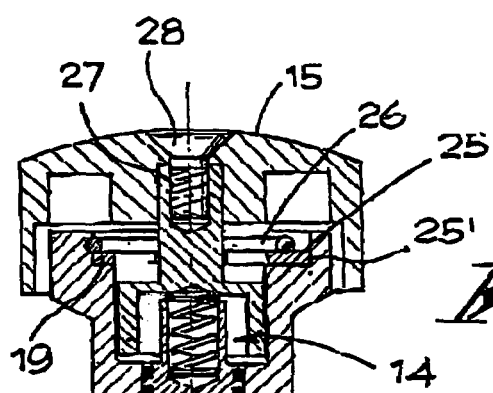
FIG. 6 shows a transversal section of the valve in an unlocked open position.
Figure 7:
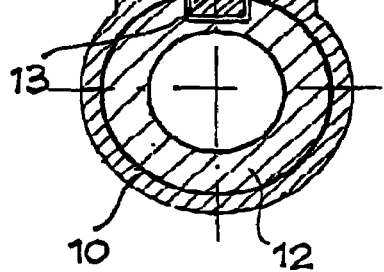
FIG. 7 represents a view from above of the valve control means in an unlocked open position.
Figure 7:
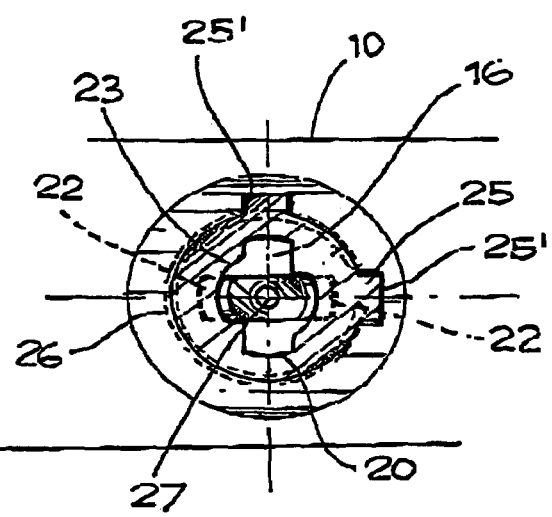

It shall be noted that in the example of embodiment represented in the drawings, when the control means 13,14 and 15 are rotated in the valve opening position—FIGS. 5, 6 and 7—the steps 22 of the second pin 14 stay below the washer 19 making the second pin 14 remain in a lowered unlocking position. This allows the control means to be rotated in the valve closure position without needing to apply any prior axial movement.

Should it also be necessary to lock the control means in the valve opening position, it would be enough to make two more slits in the washer 19 in a diametrically opposite position in relation to those connected with the valve closure position to allow the second pin 14 to be raised and angularly locked to the washer 19.

The invention claimed is:

1. Valve or tap for fluids comprising a body, a revolving shutter in said body, and control means for the rotation of said shutter, wherein said control means comprise a first pin joined to the shutter and a second pin constrained in an angular direction to the first pin, said second pin being movable in an axial direction in relation to the first pin between a raised position for locking to the body and a lowered position for unlocking from said body, wherein a washer is provided around the second pin, said washer being locked into a slot made in the body of the valve, wherein the washer presents two opposite radial slits, and wherein the second pin presents a stem having a substantially rectangular section, a step being made in each of the sides of a smaller width of said stem, said step being designed to engage in a correspondent radial slit of the washer when the second pin is in the raised position and to disengage from said radial slit when the second pin is moved in the lowered position.

2. Valve or tap according to claim 1, wherein the second pin is normally held in the raised locking position by elastic means.

3. Valve or tap according to claim 1, wherein the radial slits of the washer are connected by opposite circumference arcs, and wherein the second pin is rotatable along said arcs when it is in the lowered unlocking position.

4. Valve or tap according to claim 1, wherein the second pin presents a hollow cylindrical base guided externally into a round slot made in the body of the valve and shaped internally to join to and slide on the first pin.

5. Valve or tap according to claim 4, wherein a slot is made in the first pin for an elastic element acting on the cylindrical base of the second pin to keep the latter in the raised locking position.

6. Valve or tap according to claim 5, wherein said elastic element comprises a helical spring.

7. Valve or tap according to claim 1, wherein the washer presents at least one radial tooth designed to be inserted into a corresponding notch made in the body (10) of the valve for its angular locking to this.

8. Valve or tap according to claim 7, wherein the washer is partially overlapping the base of the second pin, and wherein an elastic ring set and locked above the washer holds this and the pins in the relative slots in the body of the valve.

9. Valve or tap according to claim 1, wherein a throttle or grip lever is fixed to the top of the second pin for operating the valve.

* * * * *